United States Patent
Jung

(10) Patent No.: US 9,594,437 B2
(45) Date of Patent: Mar. 14, 2017

(54) DIGITAL BROADCAST RECEIVER CONTROLLED BY SCREEN REMOTE CONTROLLER AND SPACE REMOTE CONTROLLER AND CONTROLLING METHOD THEREOF

(71) Applicant: LG Electronics Inc., Seoul (KR)

(72) Inventor: Dae Young Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/866,255

(22) Filed: Sep. 25, 2015

(65) Prior Publication Data

US 2016/0011679 A1     Jan. 14, 2016

Related U.S. Application Data

(63) Continuation of application No. 14/339,218, filed on Jul. 23, 2014, which is a continuation of application (Continued)

(30) Foreign Application Priority Data

Aug. 31, 2009     (KR) ........................ 10-2009-0081267

(51) Int. Cl.
*H04N 5/445*     (2011.01)
*G06F 3/00*     (2006.01)
(Continued)

(52) U.S. Cl.
CPC ............ *G06F 3/0346* (2013.01); *G06F 3/017* (2013.01); *H04N 5/4403* (2013.01);
(Continued)

(58) Field of Classification Search
CPC ............ H04N 5/44543; H04N 21/482; H04N 21/4316; H04N 21/47
(Continued)

(56) References Cited

U.S. PATENT DOCUMENTS 5,691,778 A    11/1997 Song
5,936,611 A    8/1999 Yoshida
(Continued)

FOREIGN PATENT DOCUMENTS

CN        1210648 A    3/1999
CN        1856054 A    11/2006
(Continued)

*Primary Examiner* — Jason Salce
(74) *Attorney, Agent, or Firm* — Birch, Stewart, Kolasch & Birch, LLP

(57) ABSTRACT

A method is described for controlling a television. While receiving and displaying a broadcast signal on a screen of the television, the television receives a first signal from a remote controller and displays a control icon corresponding to the remote controller on the screen. The screen is partitioned into a first and second partition, the first partition being a broadcast signal display region continuing to display the broadcast signal, and the second partition being a television control region that includes television control icons and/or subregions. A second signal is wirelessly received from the remote controller, the second signal representing a movement of the remote controller. The control icon is moved across the screen of the television in response to the movement of the remote controller. A channel list is displayed based on whether the second sign is recognized within or out of the second partition.

22 Claims, 7 Drawing Sheets

Related U.S. Application Data

No. 12/871,742, filed on Aug. 30, 2010, now Pat. No. 8,826,341.

(51) Int. Cl.

| | | |
|---|---|---|
| *G06F 13/00* | (2006.01) | |
| *G06F 3/0346* | (2013.01) | |
| *H04N 5/44* | (2011.01) | |
| *H04N 21/422* | (2011.01) | |
| *H04N 21/431* | (2011.01) | |
| *H04N 21/482* | (2011.01) | |
| *H04N 21/485* | (2011.01) | |
| *G06F 3/01* | (2006.01) | |

(52) U.S. Cl.
CPC ..... *H04N 5/44513* (2013.01); *H04N 5/44543* (2013.01); *H04N 21/4221* (2013.01); *H04N 21/42207* (2013.01); *H04N 21/42221* (2013.01); *H04N 21/42222* (2013.01); *H04N 21/4316* (2013.01); *H04N 21/482* (2013.01); *H04N 21/485* (2013.01); *H04N 21/4828* (2013.01); *H04N 21/4852* (2013.01); *H04N 2005/441* (2013.01); *H04N 2005/443* (2013.01); *H04N 2005/4408* (2013.01); *H04N 2005/4412* (2013.01); *H04N 2005/4426* (2013.01); *H04N 2005/4428* (2013.01); *H04N 2005/44556* (2013.01)

(58) Field of Classification Search
USPC ................ 725/39–40, 43–47, 51–52, 59, 61; 715/700–702, 705–711, 713, 716–726, 715/810, 814; 345/156–160
See application file for complete search history.

(56) References Cited

U.S. PATENT DOCUMENTS

| | | |
|---|---|---|
| 6,346,891 B1 | 2/2002 | Feinleib et al. |
| 6,501,516 B1 | 12/2002 | Clapper |
| 6,750,801 B2 | 6/2004 | Stefanik |
| 7,102,616 B1 | 9/2006 | Sleator |
| 7,710,396 B2 | 5/2010 | Smith et al. |
| 8,194,034 B2 | 6/2012 | Bucchieri |
| 8,310,602 B2 | 11/2012 | Roberts et al. |
| 2002/0005910 A1 | 1/2002 | Kikinis |
| 2002/0010918 A1 | 1/2002 | Mankovitz et al. |
| 2002/0011990 A1 | 1/2002 | Anwar |
| 2002/0191815 A1 | 12/2002 | Meniere et al. |
| 2003/0121059 A1 | 6/2003 | Ramaswamy |
| 2003/0128187 A1 | 7/2003 | Strubbe |
| 2003/0196199 A1 | 10/2003 | Chiu et al. |
| 2004/0109033 A1 | 6/2004 | Vienneau et al. |
| 2004/0123320 A1 | 6/2004 | Daily et al. |
| 2004/0218104 A1 | 11/2004 | Smith et al. |
| 2004/0268393 A1 | 12/2004 | Hunleth et al. |
| 2005/0073497 A1 | 4/2005 | Kim |
| 2005/0078087 A1 | 4/2005 | Gates et al. |
| 2005/0132420 A1 | 6/2005 | Howard et al. |
| 2005/0253808 A1 | 11/2005 | Yoshida |
| 2006/0148518 A1 | 7/2006 | Ferris |
| 2006/0288370 A1 | 12/2006 | Rothschild |
| 2008/0158154 A1 | 7/2008 | Liberty et al. |
| 2008/0184324 A1 | 7/2008 | Yun et al. |
| 2008/0253772 A1 | 10/2008 | Katsuyama |
| 2008/0301735 A1 | 12/2008 | Chicles |
| 2009/0007179 A1 | 1/2009 | Angiolillo et al. |
| 2009/0288041 A1 | 11/2009 | Dewar et al. |
| 2010/0192181 A1 | 7/2010 | Friedman |
| 2010/0299710 A1 | 11/2010 | Shin et al. |
| 2010/0306798 A1* | 12/2010 | Ahn ............... H04N 5/445 725/38 |
| 2010/0319024 A1 | 12/2010 | Hiraoka |

FOREIGN PATENT DOCUMENTS

| | | |
|---|---|---|
| CN | 101098424 A | 1/2008 |
| CN | 201210349 Y | 3/2009 |
| CN | 101488030 A | 7/2009 |
| EP | 1 531 621 A1 | 5/2005 |
| EP | EP 2 056 596 A1 | 5/2009 |
| JP | 2000-242427 A | 9/2000 |
| JP | 2003/518251 A | 6/2003 |
| JP | 2006-1203 A | 1/2006 |
| KR | 1999-008903 U | 3/1999 |
| KR | 10-2004-0071243 A | 8/2004 |
| WO | WO 2008/084696 A1 | 7/2008 |

\* cited by examiner

DIGITAL BROADCAST RECEIVER CONTROLLED BY SCREEN REMOTE CONTROLLER AND SPACE REMOTE CONTROLLER AND CONTROLLING METHOD THEREOF

CROSS REFERENCE TO RELATED APPLICATIONS

This application is a Continuation of co-pending U.S. application Ser. No. 14/339,218, filed on Jul. 23, 2014, which is a Continuation of U.S. application Ser. No. 12/871,742, filed on Aug. 30, 2010, (now U.S. Pat. No. 8,826,341) which claims the benefit of the Korean Patent Application No. 10-2009-0081267, filed on Aug. 31, 2009. The contents of all of these applications are hereby incorporated by reference as fully set forth herein in their entirety.

BACKGROUND OF THE INVENTION

Field of the Invention

The present invention relates to a remote controller, and more particularly, to a digital broadcast receiver controlled by a screen remote controller and a space remote controller and controlling method thereof.

Discussion of the Related Art

Generally, as digital broadcasting transmits digital videos and audio signals, it is stronger against external noise than analog broadcasting and is more advantageous for error correction than the analog broadcasting. Moreover, the digital broadcasting is advantageous in providing high resolution, vivid images and a user-oriented interactive service. Therefore, in the digital broadcasting, channels and/or functions provided to users are ongoing to increase by geometric progression.

Meanwhile, in order to control a digital broadcast receiver capable of receiving and processing the digital broadcasting, a remote control device such as a remote controller and the like is used.

However, as mentioned in the foregoing description, as the channels and function provided by the digital broadcasting are increased, it becomes difficult to implement one remote controller capable of collectively processing the channels, functions and the like.

Moreover, as capabilities proliferate, it has become more difficult to load remote controller buttons for processing the channels and functions within one remote controller, thereby hindering a user's convenience or facilitation.

SUMMARY OF THE INVENTION

Accordingly, the present invention is directed to a digital broadcast receiver controlled by a screen remote controller and a space remote controller and controlling method thereof that substantially obviate one or more problems due to limitations and disadvantages of the related art.

An object of the present invention is to provide a new paradigm of a remote controller, by which a complicated function provided by a digital broadcast and the like can be controlled with ease.

Another object of the present invention is to provide various convenient methods of controlling a display device using a space remote controller and a screen remote controller.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a digital broadcast receiver controlled by a screen remote controller and a space remote controller according to the present invention includes the steps of partitioning a portion of a whole screen of the digital broadcast receiver into at least two control regions, each displaying the screen remote controller corresponding to each unique function of the digital broadcast receiver, receiving a pointing signal from the space remote controller, determining whether the received pointing signal is recognized in a range within a specific control region within the displayed screen remote controller, and if the received pointing signal is recognized in the range within the specific control region, controlling to activate a specific function corresponding to the specific control region among unique functions of the digital broadcast receiver.

In another aspect of the present invention, a digital broadcast receiver controlled by a screen remote controller and a space remote controller according to the present invention includes a display module partitioning a portion of a whole screen of the digital broadcast receiver into at least two control regions, each displaying the screen remote controller corresponding to each unique function of the digital broadcast receiver, a receiving module receiving a pointing signal from the space remote controller, a determining module determining whether the received pointing signal is recognized in a range within a specific control region within the displayed screen remote controller, and a control module, if the received pointing signal is recognized in the range within the specific control region, controlling to activate a specific function corresponding to the specific control region among unique functions of the digital broadcast receiver.

Accordingly, the present invention provides the following effects and/or advantages.

First, according to one embodiment of the present invention, a new paradigm of a remote controller for controlling complicated channels and functions provided by digital broadcasting more easily can be provided.

Secondly, according to another embodiment of the present invention, using the correspondent relation between a space remote controller and a screen remote controller, a user gets more interested in controlling a digital broadcast receiver. Substantially, the sales of the digital broadcast receivers can be considerably affected.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Yet, the present invention is non-limited by the embodiments of the present invention. Wherever possible, the same reference numbers will be used throughout the drawings to refer to the same or like parts.

Terminologies used in the present specification adopt general terminologies, which are currently and widely used, in consideration of functions in the present invention but can be modified according to intentions of technicians skilled in the art, a practice, the advent of new technology or the like. In specific case, there is a terminology randomly chosen by the applicant. In this case, the corresponding meaning of the chosen terminology will be mentioned in the description of the corresponding part of the invention. Therefore, it is understood that the terminology used for the present specification should be construed based on the substantial meaning of the terminology and the content across the present specification instead of a simple name of the terminology.

Figure 1:
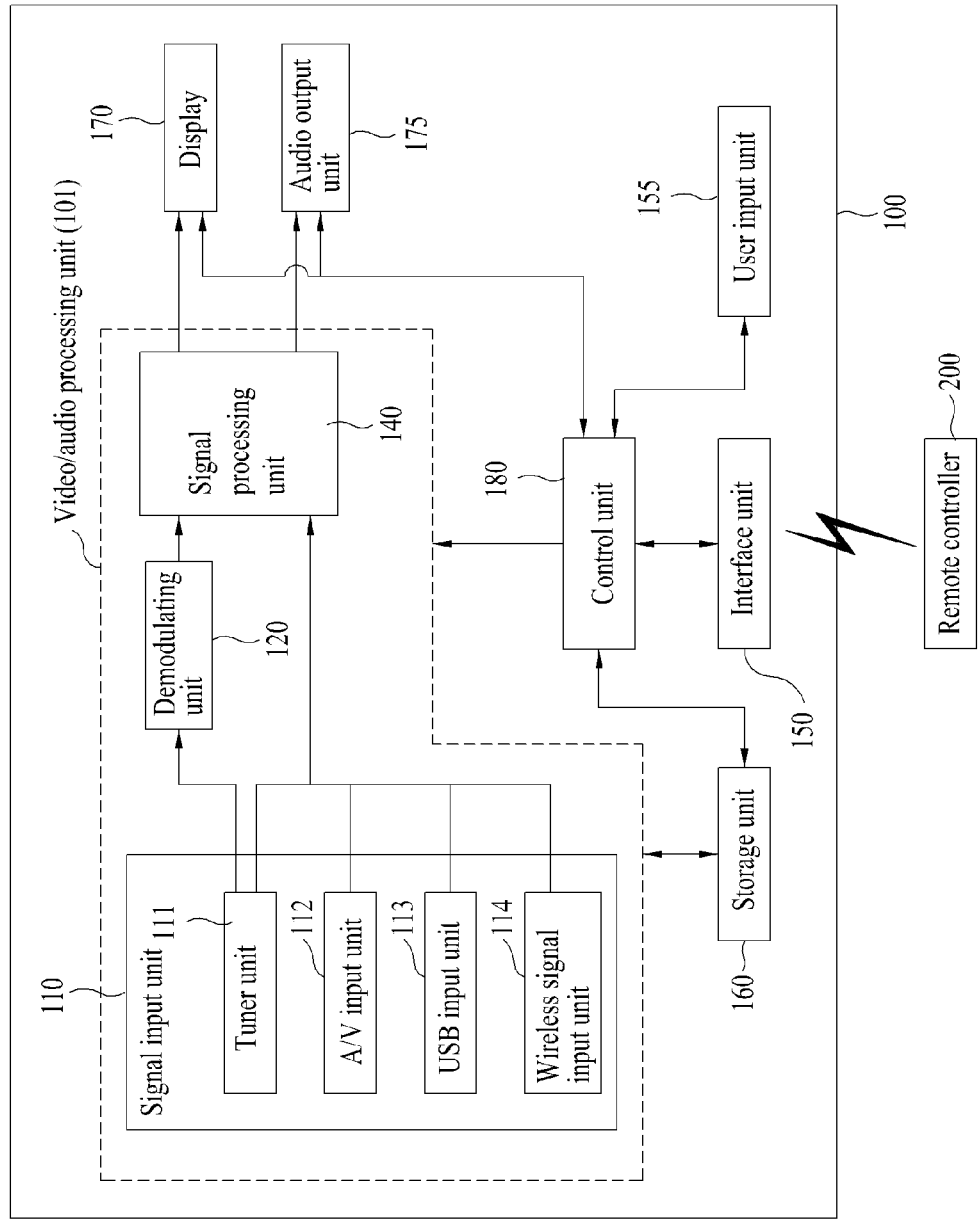
FIG. 1 is a block diagram of a digital broadcast receiver controlled by a screen remote controller and a space remote controller according to one embodiment of the present invention.

FIG. 1 is a block diagram of a digital broadcast receiver controlled by a screen remote controller and a space remote controller according to one embodiment of the present invention. For instance, blocks shown in FIG. 1 can be designed into modules. Each of the modules means one unit for processing a specific function or operation. And, the module can be implemented with hardware, software or combination thereof.

Referring to FIG. 1, a digital broadcast receiver 100 according to one embodiment of the present invention includes a video/audio processing unit 101, an interface unit 150, a storage unit 160, a display 170, an audio output unit 175, a control unit 180, and the like.

The video/audio processing unit 101 processes an inputted video/audio signal to enable video/audio to be outputted to the display/audio output unit 170/175 of the digital broadcast receiver 100. For this, the video/audio processing unit 101 can include a signal input unit 110, a demodulating unit 120, a signal processing unit 140, and the like. Moreover, the signal input unit 110 can include a tuner unit 111, an A/V input unit 112, a USB input unit 113, a wireless signal input unit 114 and the like.

The tuner unit 111 is an element that enables a user to directly change specific data in an RF (radio frequency) broadcast signal received via an antenna for example.

Moreover, a type of an object implemented in the digital broadcast receiver 100 is changeable according to a detailed option of a graphical user interface (GUI) and can include one of a volume adjust button, a channel adjust button, a menu, an icon, a navigation tab, a scroll bar, a progress bar, a text box, a window and the like, which are displayed on the display 170, for example.

Figure 2:
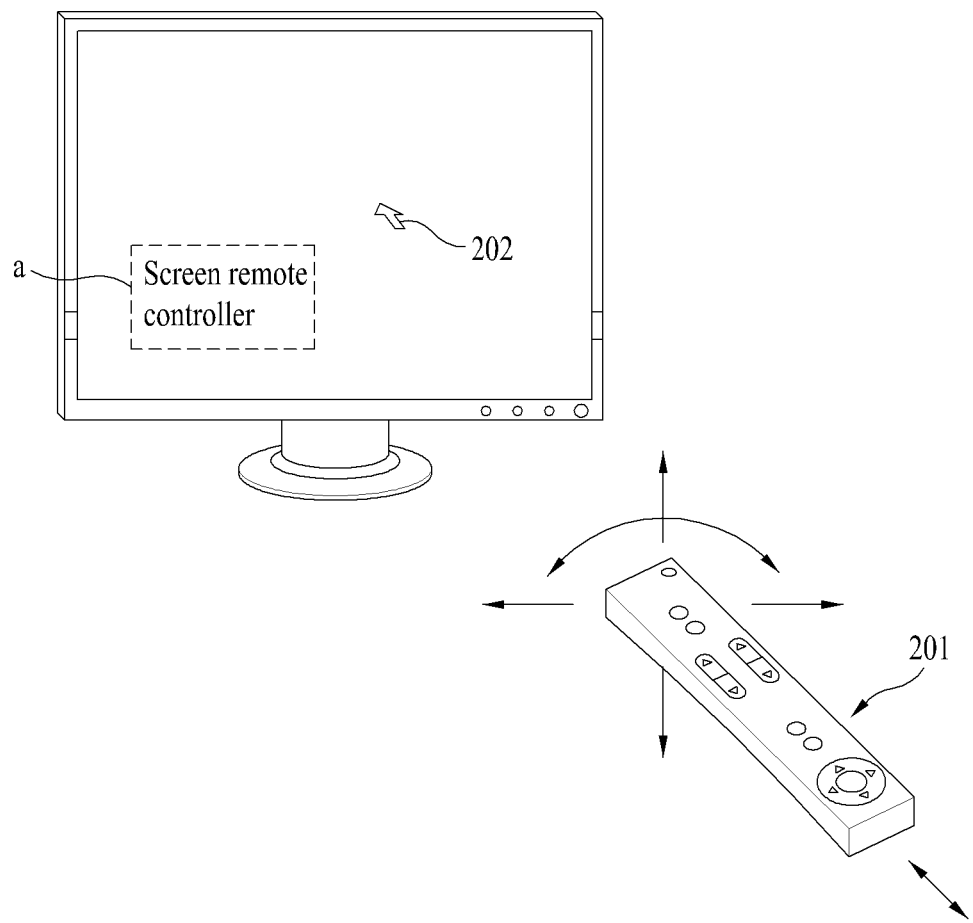
FIG. 2 and FIG. 3 are diagrams of exteriors of a space remote controller and a screen remote controller both according to one embodiment of the present invention.
Figure 3:
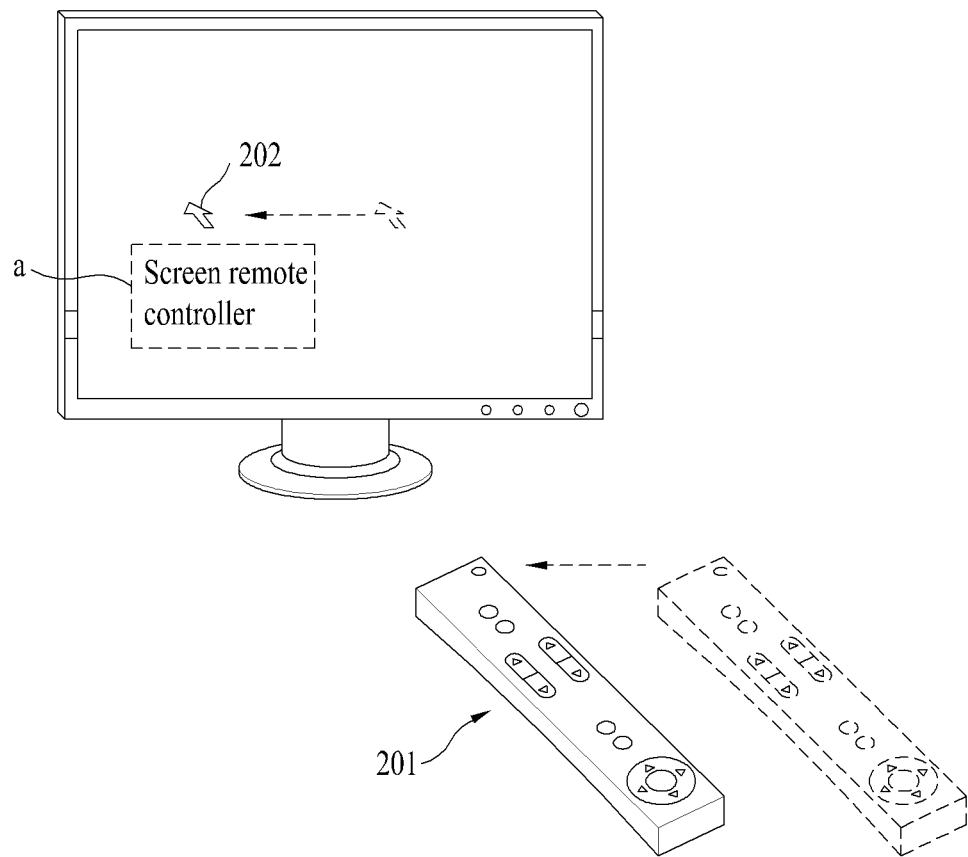
Figure 4:
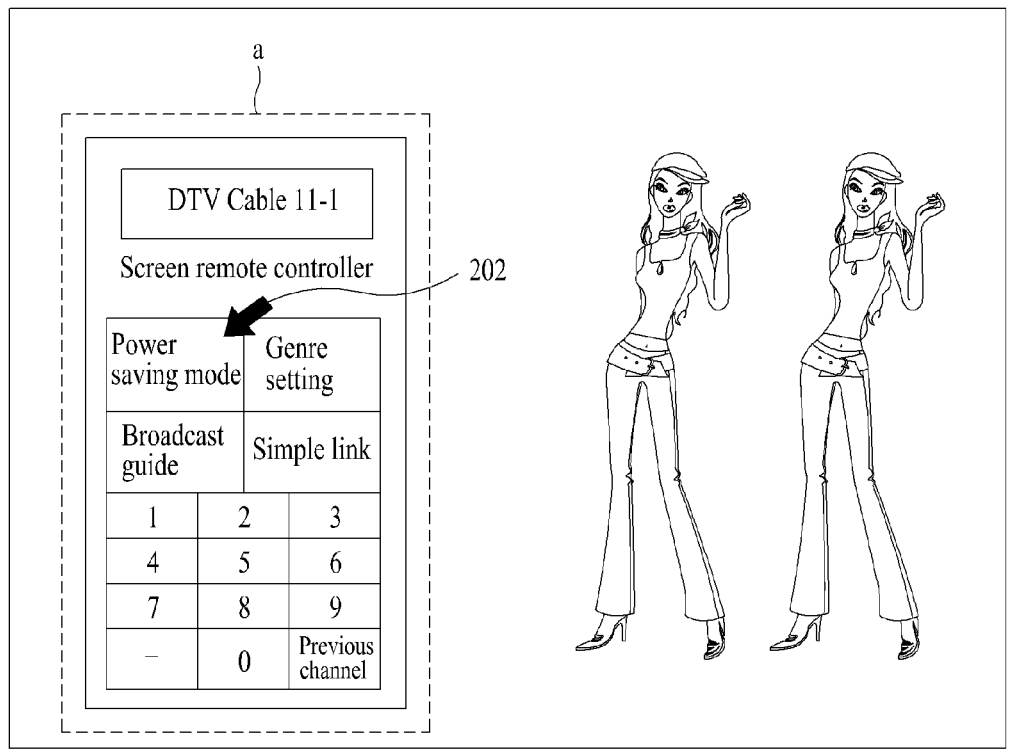
FIG. 4 is a detailed diagram of a screen remote controller according to one embodiment of the present invention.

According to another embodiment of the present invention, various kinds of display devices may replace the digital broadcast receiver 100. In this case, the display device displays a screen remote controller on a partial screen region, as shown in FIGS. 2 to 4, in a whole display screen area of the display. The display device receives a pointing signal from an external remote controller 200 (e.g., a space remote controller shown in FIG. 2, FIG. 3 or the like). If a pointing corresponding to a pointing signal received from the external remote controller is located within a specific control region within the screen remote controller, the display device selects the specific control region, as shown in FIG. 4. And, the display device executes a specific function corresponding to the selected specific control region.

Meanwhile, the screen remote controller is partitioned into at least two control regions. Each of the control regions corresponds to a function of the display device. In the following description, the screen remote controller will be explained in detail.

FIG. 2 and FIG. 3 are diagrams of exteriors of a space remote controller and a screen remote controller both according to one embodiment of the present invention.

Referring to FIG. 2 and FIG. 3, a moving speed or direction of a control icon (e.g., cursor or pointer) 202 can correspond to that of a space remote controller 201. According to one embodiment of the present invention, a cursor displayed on a screen of a digital broadcast receiver 100 is set to move to correspond to a motion of the space remote controller 201. According to another embodiment of the present invention, a prescribed command can be set to enter the digital broadcast receiver 100 to correspond to a motion of the space remote controller 201. For instance, if the space remote controller 201 is moved back and forth, a size of an image displayed on the digital broadcast receiver 100 can be enlarged or reduced.

Meanwhile, if the cursor moves within a specific region of the screen remote controller (indicated by 'a' in FIG. 2 and FIG. 3) during a predetermined period of time or stops moving within region 'a', the function corresponding to the specific region is controlled to be automatically executed.

Thus, according to one embodiment of the present invention, by managing a space remote controller and a screen remote controller to correspond to each other, user's convenience is enhanced. And, a conventional remote controller can be further simplified.

FIG. 4 is a detailed diagram of a screen remote controller according to one embodiment of the present invention.

Referring to FIG. 4, a screen remote controller is displayed in a manner that a portion of a whole screen of a digital broadcast receiver is partitioned into at least two control regions. As each of the control regions is set to correspond to each unique function of the digital broadcast receiver, the corresponding function can be executed according to a position of a pointing signal inputted from the space remote controller.

Figure 5:
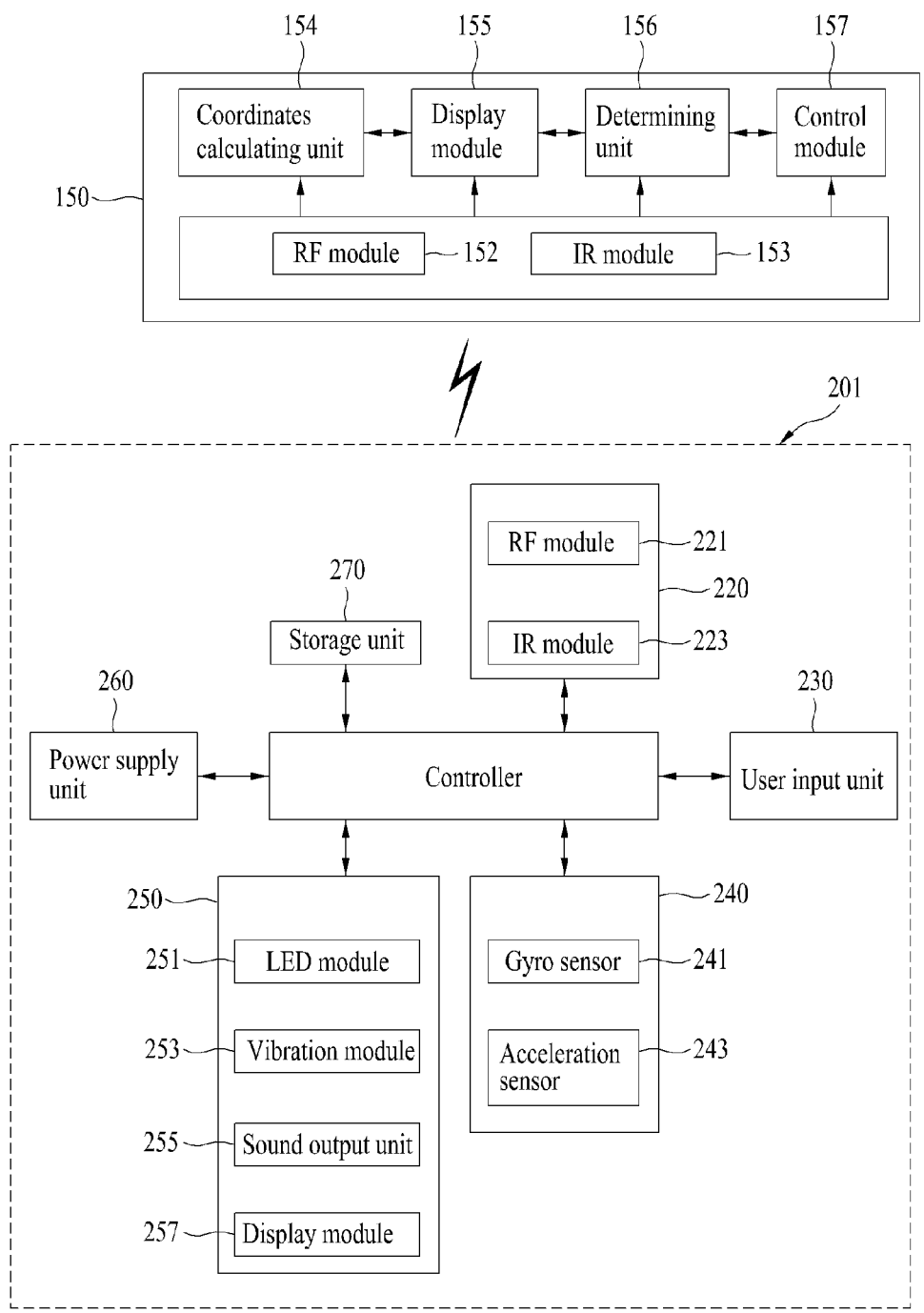
FIG. 5 is a block diagram of internal modules of a space remote controller and a screen remote controller according to one embodiment of the present invention.

FIG. 5 is a block diagram of internal modules of a space remote controller and a screen remote controller according to one embodiment of the present invention.

Referring to FIG. 5, a space remote controller 201 can include a wireless communication unit 220, a user input unit 230, a sensor unit 240, an output unit 250, a power supply unit 260, a storage unit 270, a control unit 280 and the like.

The wireless communication unit 220 transceives a signal with a digital broadcast receiver. According to one embodiment of the present invention, the space remote controller 201 is provided with an RF module 221 capable of transceiving a signal with an interface unit 150 of the digital broadcast receiver 100 according to RF communication specifications. And, the space remote controller 201 can be provided with an IR module 223 capable of transceiving a signal with the interface unit 150 of the digital broadcast receiver 100 according to IR communication specifications.

According to one embodiment of the present invention, using internal motion sensing components, the space remote controller 201 transmits a signal including information about a motion of the space remote controller 201 to the digital broadcast receiver 100 via the RF module 221. And, the space remote controller 201 is able to receive a signal transmitted by the digital broadcast receiver 100 via the RF module 221. Moreover, the space remote controller 201 transmits a command on power on/off, channel switching, volume adjustment or the like to the digital broadcast receiver 100 via the IR module 223 if necessary.

The user input unit 230 can be constructed with a keypad or at least one buttons. A user manipulates the user input unit 230 to input a command related to the digital broadcast receiver 100 to the space remote controller 201. If the user input unit 230 includes a hard key button, a user is able to input a command related to the digital broadcast receiver 100 to the space remote controller 201 in a manner of pushing the hard key button. If the user input unit 230 is provided with a touchscreen, a user touches a soft key of the touchscreen to input a command related to the digital broadcast receiver 100 to the space remote controller 201. And, the user input unit 230 can be provided with various kinds of input means (e.g., a scroll key, a jog key, etc.) that can be manipulated by a user.

The sensor unit 240 can be provided with a gyro sensor 241 or an acceleration sensor 243. The gyro sensor 241 is able to sense information on a motion of the space remote controller 201. For instance, the gyro sensor 241 is able to sense information on a motion of the space remote controller 201 with reference to x, y and z axes. And, the acceleration sensor 243 is able to sense information on a moving speed of the space remote controller 201 and the like.

The output unit 250 is able to output a video/audio signal corresponding to a manipulation of the user input unit 230 or a signal transmitted from the digital broadcast receiver 100. Through the output unit 250, a user is able to recognize whether the user input unit 230 is manipulated or whether the digital broadcast receiver 100 is controlled.

According to one embodiment of the present invention, the output unit 250 can include an LED module 251, a vibration module 253, a sound output unit 255 and/or a display module 257. In this case, if a signal is transceived with the digital broadcast receiver 100 via the wireless communication unit 220, the LED module 251 is turned on, the vibration module 253 generates vibration, the sound output unit 255 outputs a sound, and/or the display module 257 outputs a video.

The power supply unit 260 supplies a power to the space remote controller 201. If the space remote controller 201 does not move for a prescribed period of time, the power supply unit 260 cuts off the power supply to save power consumption. If a prescribed key provided to the space remote controller 201 is manipulated, the power supply unit 260 is able to resume the power supply.

The storage unit 270 can store various kinds of programs required for the controls or operations of the space remote controller 201, application data and the like. If the space remote controller 201 transceives a signal with the digital broadcast receiver 100 via the RF module 221 by wireless, the space remote controller 201 and the digital broadcast receiver 100 can transceive signals on a prescribed frequency band. The control unit of the space remote controller 201 enables information on a frequency band for transceiving signals with the digital broadcast receiver 100 paired with the space remote controller 201 to be stored in the storage unit 270 and is then able to refer to the stored information.

The control unit 280 controls overall items related to the controls of the space remote controller 201. The control unit 280 is able to transmit a signal corresponding to a prescribed key manipulation of the user input unit 230 or a signal corresponding to a motion, which is sensed by the sensor unit 240, of the space remote controller 201 to the interface unit 150 of the digital broadcast receiver 100 via the wireless communication unit 220.

The interface unit 150 of the digital broadcast receiver includes a wireless communication unit 151 (not shown in the drawing) capable of transceiving signals with the space remote controller 201 by wireless, a coordinates calculating unit 154, a display module 155, a determining unit 156, a control module 157 and the like.

The interface unit 150 is able to transceive signals with the space remote controller 201 through the RF module 152 by wireless. And, the interface unit 150 is able to receive a signal transmitted by the space remote controller 201 according to the IR communication specifications via the IR module 153.

The display module 155 partitions a portion of a whole screen of the digital broadcast receiver 100. Each of the control regions corresponds to each unique function of the digital broadcast receiver 100 and a screen remote controller is displayed on the corresponding control region.

The wireless communication unit 151 or a receiving module (not shown in the drawing) receives a pointing signal from the space remote controller 201.

The determining unit 156 determines whether the received pointing signal is recognized in a range within a specific control region within the displayed screen remote controller.

If the received pointing signal is recognized to be in the range within the specific control region, the control module 157 controls a specific function, which corresponds to the specific control region among unique functions of the digital broadcast receiver 100, to be activated.

Furthermore, the display module 155 is able to display both the control region and the summary of each of the functions corresponding to the control region simultaneously.

If the received pointing signal remains relatively still or has mobility in the range within the specific control region within the displayed screen remote controller, the determining unit 156 can regard received pointing signal as being in the range within the specific control region. While the received pointing signal is located in the range within the specific control region within the displayed screen remote controller, if a specific button signal (e.g., an 'OK' button signal) is applied, the determining module 156 is able to regard received pointing signal as being in the range within the specific control region. For instance, if the pointing signal remains still in the control region indicating Channel 9 during about 3 seconds or moves within the control region only, an operation command signal for tuning to Channel 9 is generated.

Each unique function of the digital broadcast receiver can correspond to information on at least one of a channel number, a volume level and genre setting. Therefore, according to one embodiment of the present invention, using the above described space and screen remote controllers, a conventional remote controller configuration can be further simplified. And, numerous channels and functions of digital broadcasting can be controlled more easily.

Meanwhile, according to another embodiment of the present invention, the coordinates calculating unit 154 corrects handshaking or error from a signal, which is received via the wireless communication unit 151, corresponding to the motion of the space remote controller 201 and is then able to calculate a coordinates value (x, y) of a cursor 202 to be displayed on the display 170.

A space remote controller 201 transmission signal inputted to the digital broadcast receiver 100 via the interface unit 150 is transmitted to the control unit 180 of the digital broadcast receiver 100 shown in FIG. 1. The control unit 180 shown in FIG. 1 determines information on a motion and key manipulation of the space remote controller 201 from the signal transmitted from the space remote controller 201 and is then able to control the digital broadcast receiver 100 to correspond to the determined information.

Furthermore, according to a further embodiment of the present invention, the space remote controller 201 calculates a cursor coordinates value corresponding to the motion of the space remote controller 201 and is then able to output the calculated cursor coordinates value to the interface unit 150 of the digital broadcast receiver 100. In this case, the interface unit 150 of the digital broadcast receiver 100 is able to transmit the received information on the cursor coordinates value to the control unit 180 without separate handshaking or error correction.

Also, according to another embodiment of the present invention, the display module 155 displays the trace of the pointing signal received from the space remote controller 201 continuously. In case of determining that a character corresponding to the displayed trace of the pointing signal exists based on a stored character recognition rule, the display module 155 displays a broadcast list related to the character. In this case, the broadcast list can include at least one item selected from the group consisting of a channel number including the character and a program including the character.

For instance, if the character corresponding to the displayed trace of the pointing signal is '3', it is able to display the broadcast list of channel numbers containing the character '3' such as '3', '31', '33', '39' and the like. For another instance, if the character corresponding to the displayed trace of the pointing signal is 'new', the device is able to display the broadcast list of programs containing the character 'new' such as '9 O'clock news', 'MMM news', 'Economy news' and the like.

Figure 6:
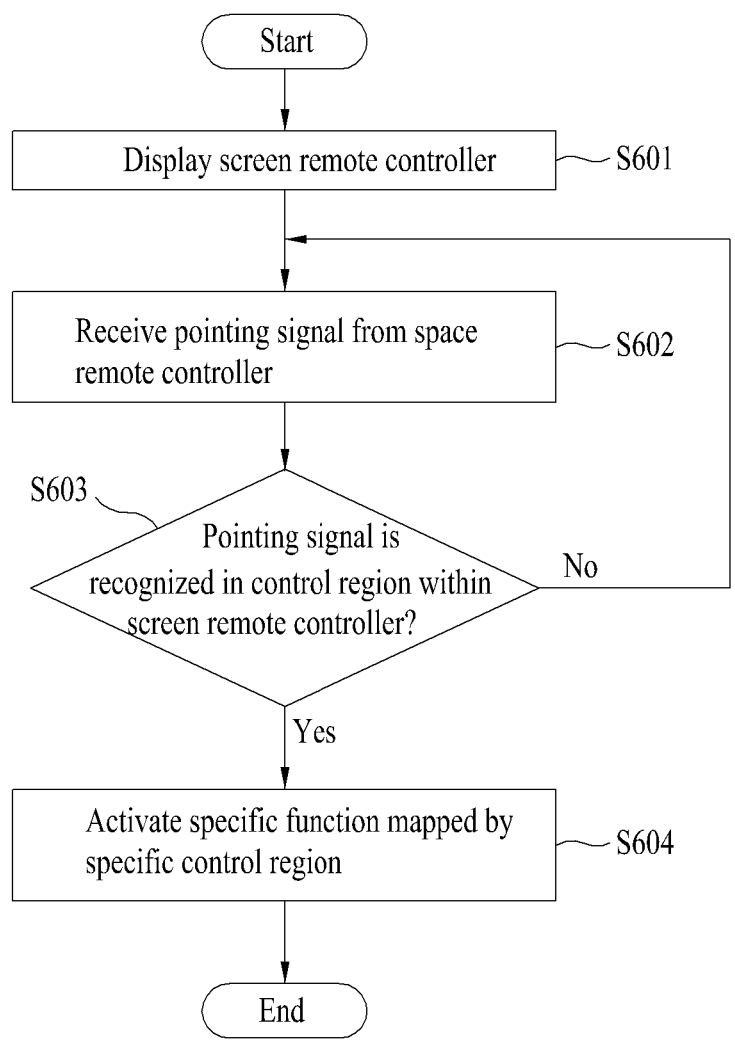
FIG. 6 is a flowchart for a method of controlling a digital broadcast receiver controlled by a space remote controller and a screen remote controller according to one embodiment of the present invention.

FIG. 6 is a flowchart for a method of controlling a digital broadcast receiver controlled by a space remote controller and a screen remote controller according to one embodiment of the present invention. FIG. 6 can be supplementarily or independently interpreted with reference to the former descriptions for FIGS. 1 to 5.

First, a portion of a whole screen of a digital broadcast receiver is partitioned into at least two control regions. Each of the control regions displays a screen remote controller corresponding to each unique function of the digital broadcast receiver [S601]. In one embodiment, one may design the step S601 to simultaneously display the control region and a summary for each function corresponding to the control region. And, each unique function of the digital broadcast receiver can correspond to at least one selected from the group consisting of a channel number, a volume level and information on genre setting for example.

A pointing signal is received from a space remote controller [S602]. Subsequently, it is determined whether the received pointing signal is recognized in a range within a specific control region within the displayed screen remote controller [S603]. Meanwhile, for instance, if the received pointing signal remains still or if the received pointing signal has mobility in the range within the specific control region within the displayed screen remote controller, the step S603 recognizes the received pointing signal to be in the range within the specific control region.

If the received pointing signal is recognized in the range within the specific control region, a specific function corresponding to the specific control region (among unique functions of the digital broadcast receiver) is controlled to be activated [S604].

Figure 7:
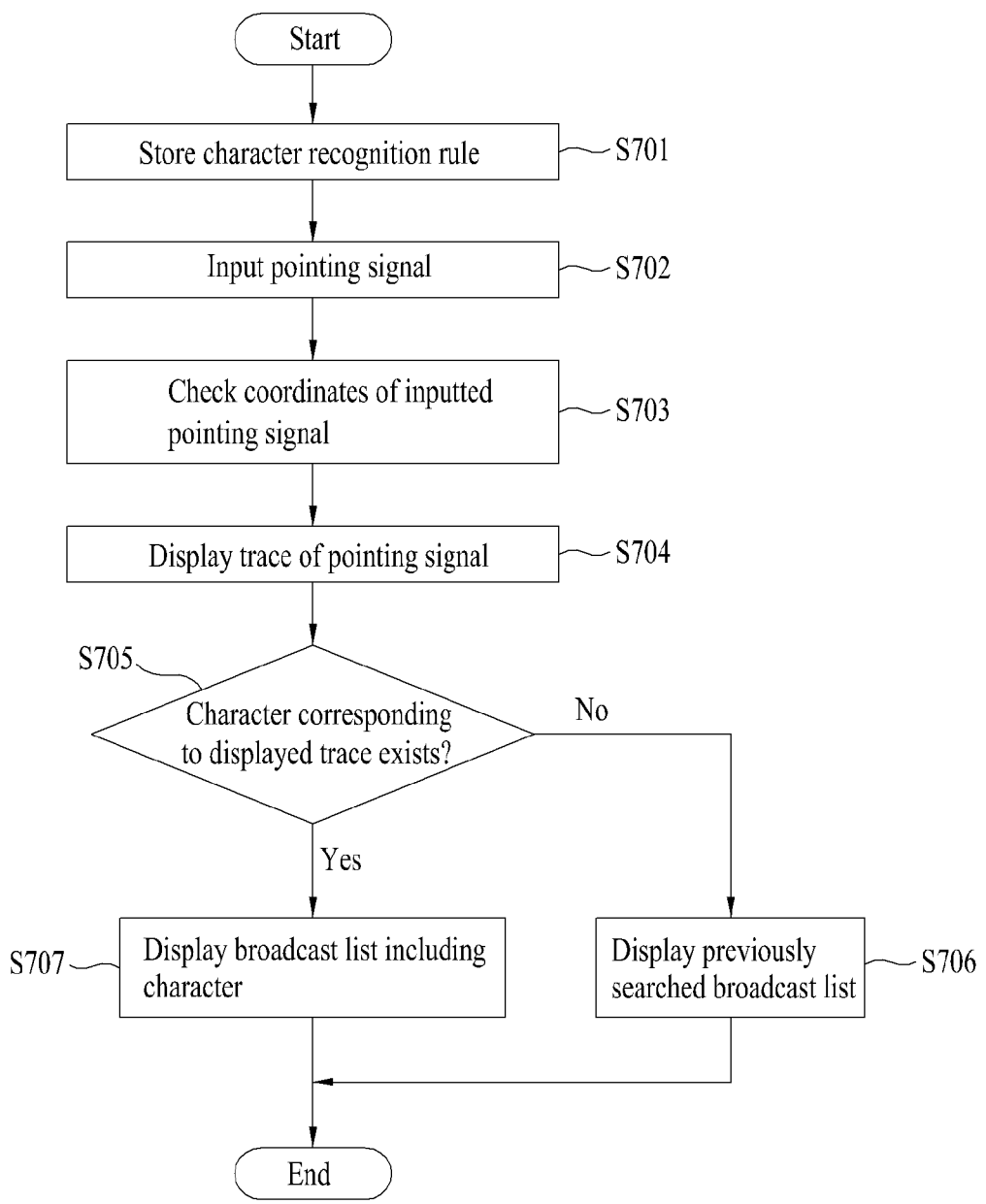
FIG. 7 is a flowchart for a method of controlling a digital broadcast receiver controlled by a space remote controller and a screen remote controller according to another embodiment of the present invention.

FIG. 7 is a flowchart for a method of controlling a digital broadcast receiver controlled by a space remote controller and a screen remote controller according to another embodiment of the present invention. FIG. 7 can be supplementarily or independently interpreted with reference to the former descriptions for FIGS. 1 to 6.

Referring to FIG. 7, a digital broadcast receiver according to one embodiment of the present invention has a character recognition rule stored in a memory [S701]. In this case, the character recognition rule may be a technique for automatically recognizing an image figure randomly marked by a user or the like as a character intended by the user or the like. The character recognition may follow a conventional character recognition rule. Alternatively, one embodiment of the preset invention can be implemented according to a following process as well.

The digital broadcast receiver receives an input of a pointing signal from a space remote controller [S702] and then checks a coordinates value of the inputted pointing signal [S703]. And, the digital broadcast receiver determines whether a character corresponding to a trace displayed according the checked coordinates value exists [S704].

As a result of the determining step S704, if the corresponding character does not exist or is not recognized, a previously searched broadcast list is displayed [S705]. On the contrary, if the character corresponding to the trace is recognized, a broadcast list including the existing character is displayed [S706]. In displaying the broadcast list, the device is able to use a channel number or broadcast side data provided by EPG or the like.

Accordingly, in a broadcast receiver according to one embodiment of the present invention, a method of controlling a broadcast receiver controllable by a screen remote controller includes the steps of displaying a screen remote controller partitioning a portion of a whole screen of the broadcast receiver into at least two control regions, displaying a cursor to enable a first pointing signal outputted from the space remote controller to indicate one control region of the screen remote controller, receiving a second pointing signal from the space remote controller, and executing a function corresponding to the one control region indicated by the cursor. In this case, the second pointing signal can correspond to a confirm command signal for executing the function corresponding to the control region.

A method of controlling a broadcast receiver according to another embodiment of the present invention includes the steps of receiving a signal for changing a mode of the broadcast receiver and displaying a screen remote controller corresponding to the received mode based on the received mode. In this case, the mode includes at least one of a mode for executing a DVD function, a mode for executing an internet function and a mode for executing a photo editing function.

Moreover, the function corresponding to the control region corresponds to at least one of channel up/down, channel number, sound up/down and information on genre setting. The broadcast receiver can further display information indicating a function mapped by the control region on the control region. The broadcast list includes at least one of a channel number corresponding to the displayed trace and a program title including a character.

The broadcast receiver includes a digital broadcast receiver. And, the digital broadcast receiver includes at least one of an IPTV (internet protocol TV) and a BBTV (broadband TV).

Thus, according to one embodiment of the present invention described with reference to FIGS. 1 to 7, it is possible to remove numerous buttons attached to a conventional remote controller using a new paradigm of a dual remote controller including a so-called a space remote controller and a so-called screen remote controller.

In another embodiment, it is possible for a user to use the remote controller 201 to move the screen remote controller "a" by moving the cursor 202 onto the screen remote controller "a" and dragging the screen remote controller "a".

In another embodiment, it is also possible for a user to use the remote controller 201 to move the screen remote controller "a" by moving the cursor 202 onto the screen remote controller "a" and dragging a corner or edge of the screen remote controller "a" or via a predefined motion of the remote controller 201 or via a button on the remote controller 201.

In another embodiment, it is also possible for a user to use the remote controller 201 to adjust a level of transparency the screen remote controller "a" by moving the cursor 202 onto the screen remote controller "a" and executing a predefined motion of the remote controller 201 or using a button on the remote controller 201.

In another embodiment, it is possible to activate and display the screen remote controller "a" by moving the cursor 202 onto a first predetermined area of the screen and leaving the cursor within the first predetermined area for a predetermined period of time. If the cursor 202 is maintained in the first predetermined area for less than the predetermined period of time, the screen remote controller "a" is not activated and is not displayed. The first predetermined area may be an area corresponding to the area of the screen remote controller "a", or maybe another area, including an edge or corner of the screen. Once activated, the screen remote controller "a" may be deactivated and removed from the screen by moving the cursor 202 onto a second predetermined area of the screen and leaving the cursor within the second predetermined area for a predetermined period of time. The second predetermined area maybe the same as or different from the first predetermined area.

In another embodiment, it is possible to activate and display the screen remote controller "a" by moving the cursor 202 in a first predetermined pattern. Once activated, the screen remote controller "a" may be deactivated and removed from the screen by another by moving the cursor 202 in a second predetermined pattern. The first and second predetermined patterns may be the same or may be different.

According to one embodiment of the present invention, it is facilitated to customize a screen remote controller to be suitable for user's age, taste and the like.

According to one embodiment of the present invention, in case that a function of a digital broadcast receiver is frequently added or deleted, it is able to cope with the aforesaid situations in a manner of just updating a program of a screen remote controller without modifying hardware or buttons of a conventional remote controller.

Meanwhile, a method according to the present invention is recordable in a computer readable medium in a manner of being implemented into a program command type executable through various computer means. The computer readable medium can store a program command, a data file, a data structure or combinations thereof. The program command recorded in the medium is specially designed and configured for the present invention or can be known in public to those skilled in the field of software. For example, the computer readable recording medium includes a magnetic medium such as a hard disk, a floppy disk and a magnetic tape, an optical medium such as a CD, CD-ROM and DVD, a magneto-optical medium such as a floptical disk, or such a hardware device specially configured to store and execute a program command as a ROM, a RAM, a flash memory and the like. For example, the program command includes a machine code created by compiler or a high-level language code executable by a computer using an interpreter and the like. The hardware device can be configured to operate as at least one software module to perform an operation of the present invention, and vice versa.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital broadcast receiver controlled by a motion remote controller, the digital broadcast receiver comprising:
   an infrared (IR) module configured to receive an IR signal from the motion remote controller;
   a controller configured to change a power-off state of the broadcast receiver into a power-on state of the broadcast receiver based on the received IR signal; and
   a radio frequency (RF) module configured to receive an RF signal from the motion remote controller,
   wherein the controller is further configured to:
      display a screen remote controller in a predetermined region on a screen and during displaying of a broadcast program on the screen, wherein the screen remote controller comprises a first, second and third control regions, the first control region corresponding to at least one number used to change at least one channel of the broadcast receiver, the second control region corresponding to at least one special character used to identify a major channel number with a minor channel number and the third control region corresponding to a function item for returning to a previous channel, move a position of a pointer within the screen remote controller based on movement information of the motion remote controller included in the RF signal, and change a current channel into another channel in response to the pointer being located at a specific control region among the first, second and third control regions within the screen remote controller and a specific button signal being received from the motion remote controller.

2. The digital broadcast receiver of claim 1, wherein the movement information of the motion remote controller further identifies direction information and speed information of a movement of the motion remote controller.

3. The digital broadcast receiver of claim 1, further comprising:
a memory configured to store data on a frequency band for pairing the digital broadcast receiver with the motion remote controller.

4. The digital broadcast receiver of claim 3, wherein the screen remote controller corresponds to image data pre-stored in the memory.

5. The digital broadcast receiver of claim 1, wherein a location of the pointer within the screen remote controller is further configured to be controlled by a touch sensor included in the motion remote controller as well as a motion sensor included in the motion remote controller.

6. The digital broadcast receiver of claim 5, wherein the location of the pointer is changed depending on the movement information from the touch sensor as well as the motion sensor.

7. The digital broadcast receiver of claim 6, wherein the controller is further configured to enlarge or reduce a size of the screen remote controller displayed on the screen in response to the motion remote controller being moved back and forth.

8. A method for processing data in a digital broadcast receiver, the method comprising:
receiving an infrared (IR) signal from a motion remote controller;
changing a power-off state of the broadcast receiver into a power-on state based on the received IR signal;
receiving a radio frequency (RF) signal from the motion remote controller;
displaying a screen remote controller in a predetermined region of a screen and during displaying of a broadcast program, wherein the screen remote controller comprises a first, second and third control regions, the first control region corresponding to at least one number used to change at least one channel of the broadcast receiver, the second control region corresponding to at least one special character used to identify a major channel number with a minor channel number and the third control region corresponding to a function item for returning to a previous channel;
moving a position of a pointer within the screen remote controller based on movement information of the motion remote controller included in the RF signal; and
changing a current channel into another channel in response to the pointer being located at a specific control region among the first, second and third control regions within the screen remote controller and a specific button signal being received from the motion remote controller.

9. The method of claim 8, wherein the movement information of the motion remote controller further identifies direction information and speed information of a movement of the motion remote controller.

10. The method of claim 8, further comprising:
storing data on a frequency band into a memory for pairing the digital broadcast receiver with the motion remote controller.

11. The method of claim 10, wherein the screen remote controller corresponds to image data pre-stored in the memory.

12. The method of claim 8, wherein a location of the pointer within the screen remote controller is further configured to be controlled by a touch sensor included in the motion remote controller as well as a motion sensor included in the motion remote controller.

13. The method of claim 12, wherein the location of the pointer is changed depending on the movement information from the touch sensor as well as the motion sensor.

14. The method of claim 13, further comprising:
enlarging or reducing a size of the screen remote controller in response to the motion remote controller being moved back and forth.

15. The digital broadcast receiver of claim 1, wherein the controller is further configured to stop displaying the screen remote controller after a predetermined period of time.

16. The digital broadcast receiver of claim 1, wherein display coordinates of the screen remote controller are controlled by the motion information of the motion remote controller.

17. The digital broadcast receiver of claim 1, wherein the controller is further configured to display at least one control region on the screen for performing another function different than the changing at least one channel of the broadcast receiver.

18. The digital broadcast receiver of claim 17, wherein the at least one control region includes a guide control region for providing a broadcast guide in response to the position of the pointer being located within the guide control region.

19. The digital broadcast receiver of claim 17, wherein the controller is further configured to display the at least one control region above the first control region corresponding to at least number used to change at least one channel of the broadcast receiver.

20. The digital broadcast receiver of claim 1, wherein
wherein the first control region includes the numbers 1, 2, 3, 4, 5, 6, 7, 8, 9 and 0; the special character of the second control region includes the dash character "-"; and the third control region corresponding to the function item for returning to the previous channel includes information for returning to the previous channel.

21. The digital broadcast receiver of claim 1, wherein functions corresponding to the first control region, the second control region and the third control are absent from the motion remote controller.

22. The digital broadcast receiver of claim 1, wherein a number of sub-regions on the screen remote controller for executing functions on the digital broadcast receiver is greater than a number of sub-regions on the motion remote controller for controlling functions on the digital broadcast receiver.

* * * * *